Patented Feb. 27, 1940

2,191,685

UNITED STATES PATENT OFFICE 2,191,685

PROCESS FOR PRODUCING NITROGENOUS CONDENSATION PRODUCTS OF THE ANTHRONE SERIES

Heinz Scheyer, Frankfort-on-the-Main, and Emil Schwamberger, Frankfort-on-the-Main-Fechenheim, Germany, assignors to General Aniline & Film Corporation, a corporation of Delaware No Drawing. Application June 23, 1936, Serial No. 86,772. In Germany June 27, 1935

1 Claim. (Cl. 260—261)

Our invention relates to a process for producing nitrogenous condensation products of the anthrone series. The new process comprises condensing, in the presence of an alkaline-acting condensing agent, anthrone derivatives such as anthrapyridones, N-alkyl-pyrazolanthrones, anthrapyridines, anthrapyrimidines, phthaloylbenzanthrones, anthanthrones, dibenzoperylene quinones and dibenzopyrene quinones with a member selected from the group consisting of amines of the benzene, naphthalene and vattable ring series, whereby the condensation reaction takes place in such a way that the two hydrogen atoms are split off, so that the reaction corresponds to an oxidation process. If there are substituents such as halogen present in the anthrone derivative, but not in that position wherein condensation with the amine occurs, they remain unaltered and do not condense with the reactive hydrogen atoms of the amine. According to our process, aminated anthrone derivatives still containing halogen can be obtained which are not obtainable according to the known processes of amination.

The reaction, which occurs in many cases at room or slightly elevated temperatures, is advantageously carried out in the presence of a suitable diluent such as pyridine, quinoline or nitrobenzene. In many cases one may work while cooling the reaction mass. As alkaline condensing agents particularly caustic alkalies and sodium amide may be named.

Since by the reaction hydrogen is freed, one may work in some cases in the presence of an oxidant for instance while blowing in air.

The new condensation products obtained according to the process of our invention partly dye the fibers valuable shades, partly they may be used as intermediates for the production of dyestuffs.

In order to further illustrate our invention the following examples are given, the parts being by weight and all temperatures in centigrade degrees. However, we wish it to be understood that our invention is not limited to the particular products nor reaction conditions mentioned therein.

Example 1

A mixture of 2.6 parts of N-methylanthrapyridone, 5 parts of aniline, 10 parts of caustic potash and about 50 parts of pyridine is stirred at about 50° C. for 24 hours. The formed condensation product is filtered off, acidified, washed out and dried. The new condensation product of the probable formula:

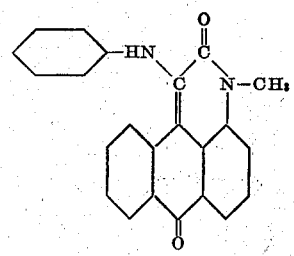

dissolves in concentrated sulfuric acid with an intense bluish green color.

Example 2

A mixture of 10 parts of N-methylanthrapyridone, 9.5 parts of 1-aminoanthraquinone, 40 parts of caustic potash and about 300 parts of pyridine is stirred at about 50° C. for 6 hours. The formed condensation product is filtered off, the residue is neutralized and dried. The new product of the probable formula:

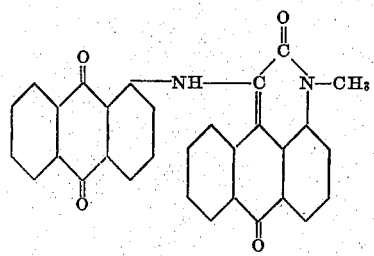

is an orange powder, which may be crystallized from chlorobenzene as orange crystals, soluble in concentrated sulfuric acid with a dichroic olive-green and red color. The product dissolves in an alkaline hydrosulfite solution with a yellowish red color.

Example 3

A mixture of 12 parts of $bz_1$-$bz_2$-phthaloylbenzanthrone, 8 parts of 1-aminoanthraquinone, 50 parts of caustic potash and about 400 parts of pyridine is stirred for about 12 hours at room temperature. The condensation product of the probable formula:

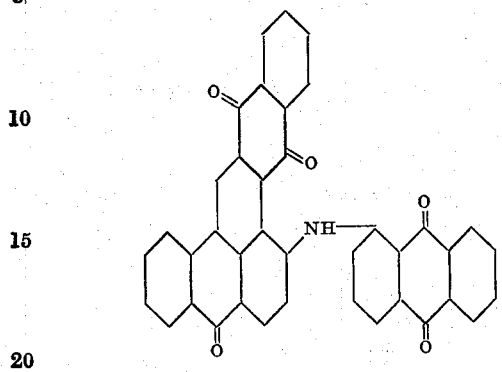

crystallizes from nitrobenzene as violet crystals, soluble in concentrated sulfuric acid with a reddish brown color.

*Example 4*

A mixture of 5 parts of anthanthrone, 10 parts of aniline-meta-sulfanilide, 25 parts of caustic potash and about 100 parts of pyridine is stirred at room temperature for about 20 hours. The reaction product of the probable formula:

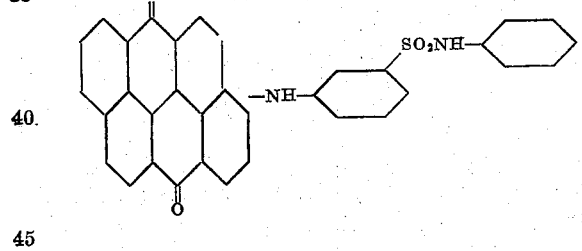

crystallizes from nitrobenzene as brownish violet needles. It dissolves in concentrated sulfuric acid with a violet color and dyes cotton from a bluish violet vat violet-brown shades. By treatment with sulfuric acid the sulfanilidogroup in the molecule of the condensation product can be saponified. The sulfonic acid thus obtained is a dyestuff, which dyes wool violet-brown shades.

When replacing in the foregoing example the aniline-meta-sulfanilide by anthranilic acid methylester a violet-brown condensation product is formed which by aftertreatment with chlorosulfonic acid is converted into a bluish gray vat dyestuff of the acridone type.

*Example 5*

A mixture of 10 parts of anthanthrone, 30 parts of 1-naphthylamine, 50 parts of caustic potash and about 200 parts of pyridine is stirred for about 20 hours at room temperature. Then the reaction product is filtered off, washed out with pyridine and poured into dilute hydrochloric acid. The new condensation product is when dry a violet powder crystallizable from nitrobenzene as violet-brown crystals soluble in concentrated sulfuric acid with a greenish blue color whereby sulfonation occurs. The new compound dissolves in an alkaline hydrosulfite vat only after the addition of alcohol with a blue color.

The new compound corresponds probably to the formula:

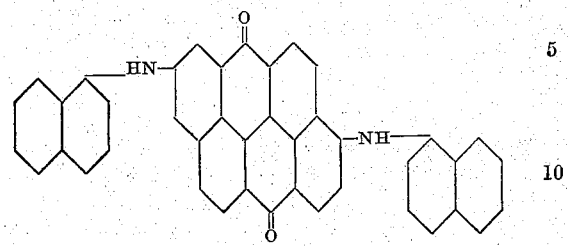

When replacing in the foregoing example the α-naphthylamine by para-toluidine a red condensation product is obtained, soluble in concentrated sulfuric acid with a bluish violet color and in the vat with a violet color.

*Example 6*

A mixture of 10 parts of anthanthrone, 9 parts of 1-amino-anthraquinone, 40 parts of powdered sodium amide and about 200 parts of pyridine is stirred for about 5 hours at about 50° C. The formed condensation product is filtered off and poured on dilute hydrochloric acid. The violet-brown product which may have been extracted with warm orthodichloro-benzene in order to remove some quantities of unchanged anthanthrone dissolves in concentrated sulfuric acid with a violet color and dyes cotton from a violet vat very fast curry-like shades. It corresponds probably to the formula:

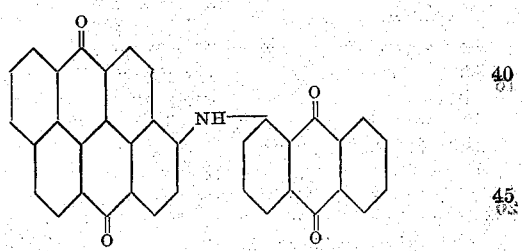

When using instead of sodium amide the same amount of caustic potash and instead of 9 parts of 1-aminoanthraquinone 15 parts thereof or of 2-aminoanthraquinone the formed products which contain probably twice the radicle of the aminoanthraquinones attached to anthanthrone are violet-brown and brown powders respectively soluble in concentrated sulfuric acid with an olive-green and dull violet color and dyeing cotton bright reddish curry like and reddish brown shades. The product obtained by using 1-aminoanthraquinone is not identical with that obtained by condensing dibromanthanthrone with 1-aminoanthraquinone.

When aftertreating with a sodium-aluminium-chloride melt the new product obtained by using 1-aminoanthraquinone is converted into an orange vat dyestuff soluble in concentrated sulfuric acid with a reddish brown color.

*Example 7*

A mixture of 10 parts of anthanthrone, 24 parts of 1-amino-4-benzoylaminoanthraquinone, 50 parts of caustic potash and about 200 parts of pyridine is milled at room temperature for about 24 hours. The formed potassium salt is filtered off, the residue is poured on dilute hydrochloric acid whereby a gray substance separates which may be purified by extraction with for instance dichlorobenzene. The raw product is a mixture of two reaction products obtained by acting with anthanthrone on one and two molecular proportions of 1-amino-4-benzoylaminoanthraquinone, which may be separated according to the known methods, for instance by fractional crystallization from highly boiling organic solvents. When extracting the raw product for instance with hot trichlorobenzene from the liquor of extraction the gray monosubstitution product of the probable formula:

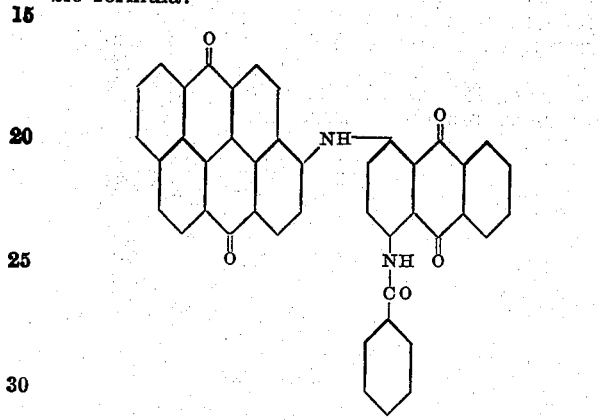

separates. It dissolves in concentrated sulfuric acid with a violet color and dyes cotton from a reddish violet vat fast gray shades. The residue from the liquor of extraction is a bluish gray body consisting substantially of the disubstitution product of anthanthrone. It dissolves in concentrated sulfuric acid with an olive color and dyes cotton from a bluish violet vat fast bluish gray shades.

*Example 8*

A mixture of 10 parts of dibromanthanthrone, 15 parts of 1-aminoanthraquinone, 40 parts of caustic potash and about 200 parts of pyridine or nitrobenzene is stirred for about 5 hours at 50 to 60° C. The condensation product may be extracted with boiling nitrobenzene in order to remove unchanged dibromanthanthrone. The residue is a brown crystalline powder, soluble in concentrated sulfuric acid with a pure blue color, and dyes cotton from a bluish violet vat strong and fast violet-brown shades. According to analysis the product corresponds to the general formula:

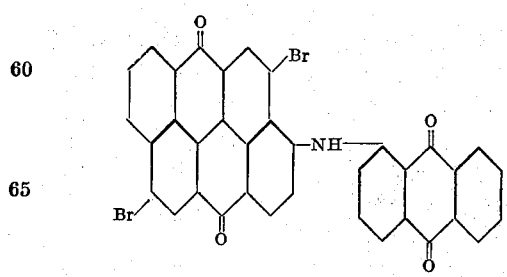

*Example 9*

A mixture of 9.5 parts of dibenzoperylenequinone, 9 parts of 1-amino-4-benzoylaminoanthraquinone, 50 parts of caustic potash and about 400 parts of pyridine is stirred at room temperature for about 12 hours. The condensation product of the probable formula:

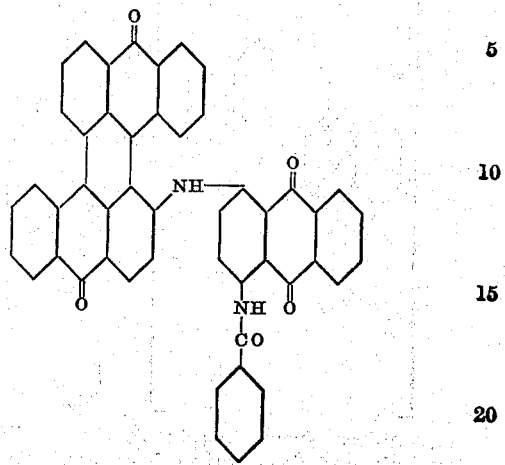

crystallizes from nitrobenzene as violet crystals, soluble in concentrated sulfuric acid with a dull bluish green color and dyes cotton violet shades from a green vat.

*Example 10*

A mixture of 10 parts of 3,4,8,9-dibenzopyrenequinone (5,10), 4 parts of 2-aminoanthraquinone, 50 parts of caustic potash and about 240 parts of pyridine is stirred for about 24 hours at about 50° C. The reaction product of the probable formula:

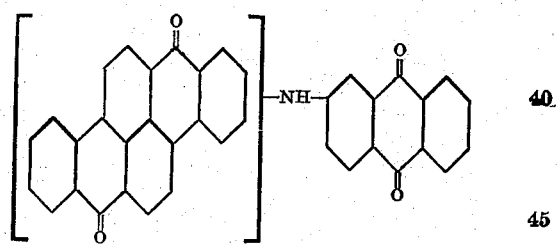

crystallizes from nitrobenzene, dissolves in concentrated sulfuric acid with a somewhat bluish violet color and dyes cotton from a bluish red vat fast reddish brown shades.

When replacing 2-aminoanthraquinone by the same amount of 1-aminoanthraquinone the formed dyestuff dyes cotton substantially more yellowish brown shades.

The condensation of dibromdibenzopyrenequinone with 2-aminoanthraquinone yields a dyestuff, still containing the two bromine atoms and dyeing cotton reddish brown shades from the vat.

When condensing 4, 5, 8, 9-dibenzopyrenequinone (3, 10) with 1-amino-5-benzoylaminoanthraquinone the formed dyestuff is a violet-brown crystalline powder and dyes cotton from a reddish brown vat curry-like shades.

*Example 11*

A mixture of 4.9 parts of dibromo 3, 4, 8, 9-dibenzopyrenequinone (5, 10), obtained by brominating dibromodibenzopyrenequinone, 3, 7 parts of 1-amino-4-benzoylaminoanthraquinone, 15 parts of caustic potash and about 100 parts of pyridine or nitrobenzene is milled for about 24 hours at room temperature and stirred for further 24 hours at about 50° C. The condensation product of the probable formula:

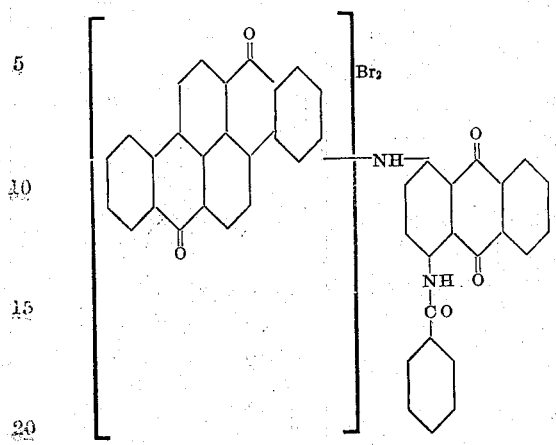

crystallizes from nitrobenzene as olive-green crystals and dyes cotton from a bluish red vat olive shades of a good fastness, particularly to light.

We claim:

A process of making nitrogenous condensation products of the anthrone series which comprises condensing at a temperature not higher than 60° C. an anthrone derivative selected from the group consisting of anthrapyridones, N-alkyl-pyrazolanthrones, anthrapyridines, anthrapyrimidines, phthaloyl-benzanthrones, anthanthrones, dibenzoperylene quinones and dibenzopyrene quinones with a member selected from the group consisting of primary mono-amines of the benzene, naphthalene and anthraquinone series, in the presence of an alkaline-acting condensing agent, whereby two hydrogen atoms are split off and whereby a substituent, not standing in that position wherein the condensation with the amine occurs, remains unaltered.

HEINZ SCHEYER.
EMIL SCHWAMBERGER.